US012485520B2

(12) United States Patent
Ying et al.

(10) Patent No.: US 12,485,520 B2
(45) Date of Patent: Dec. 2, 2025

(54) DRIVING MECHANISM AND NAIL GUN HAVING SAME

(71) Applicant: TAIZHOU DAJIANG IND. CO. LTD., Wenling (CN)

(72) Inventors: Qinling Ying, Wenling (CN); Mingjun Yang, Wenling (CN); Shangshi Cai, Wenling (CN); Bingzhen Jiang, Wenling (CN); Tao Yang, Wenling (CN); Haijun Li, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

(21) Appl. No.: 18/665,655

(22) Filed: May 16, 2024

(65) Prior Publication Data

US 2024/0300080 A1 Sep. 12, 2024

Related U.S. Application Data

(63) Continuation of application No. PCT/CN2022/101892, filed on Jun. 28, 2022.

(30) Foreign Application Priority Data

Nov. 29, 2021 (CN) ......................... 202111431425.4

(51) Int. Cl.
*B25C 1/06* (2006.01)

(52) U.S. Cl.
CPC ...................................... *B25C 1/06* (2013.01)

(58) Field of Classification Search
CPC ........................................................ B25C 1/06
See application file for complete search history.

(56) References Cited

U.S. PATENT DOCUMENTS 2,917,747 A * 12/1959 Marano ...................... B25C 5/10 227/132
3,061,833 A * 11/1962 De Caro ................. B25C 1/143 227/10

(Continued)

FOREIGN PATENT DOCUMENTS

CN 101218070 A * 7/2008 ............... B25C 1/06
CN 101274425 A 10/2008

(Continued)

OTHER PUBLICATIONS

International Search Report issued by the China National Intellectual Property Administration for Application No. PCT/CN2022/101892, China, Oct. 10, 2022.

*Primary Examiner* — Lucas E. A. Palmer
(74) *Attorney, Agent, or Firm* — Troutman Pepper Locke LLP; Tim Tingkang Xia, Esq.

(57) ABSTRACT

A driving mechanism and a nail gun having the same. The driving mechanism includes a driving force supply unit comprising a frame structure having a front limiting seat and a rear limiting seat; a piston movably arranged between the front limiting seat and the rear limiting seat in the frame structure; a striker co-movably connected to the piston; and a spring assembly disposed between the piston and the rear limiting seat in the frame structure, configured such that when the piston is driven to move backward in the frame structure, the spring assembly is pushed into a contract state to store energy therein, and when the piston is free, the spring assembly expands to release the stored energy therein to push the piston to move forward in the frame structure so that the striker is co-moved therewith to strike a nail out of a muzzle.

16 Claims, 14 Drawing Sheets

(56) References Cited

U.S. PATENT DOCUMENTS

| | | | | | |
|---|---|---|---|---|---|
| 4,565,313 | A * | 1/1986 | Buck | B25C 1/06 | 173/117 |
| 5,482,261 | A * | 1/1996 | Ortega | F16F 3/06 | 267/168 |
| 2015/0197961 | A1 * | 7/2015 | Burenga | F16F 1/125 | 173/202 |
| 2016/0096259 | A1 | 4/2016 | Pedicini | | |
| 2016/0201353 | A1 * | 7/2016 | Niekamp | E04H 17/263 | 173/124 |
| 2021/0060749 | A1 * | 3/2021 | Yang | B25C 1/008 | |
| 2023/0405781 | A1 * | 12/2023 | Huang | B25C 1/047 | |
| 2024/0326209 | A1 * | 10/2024 | Ying | B25C 1/06 | |

FOREIGN PATENT DOCUMENTS

| | | | | |
|---|---|---|---|---|
| CN | 102744709 | A | 10/2012 | |
| CN | 211565764 | U | 9/2020 | |
| CN | 211589989 | U | 9/2020 | |
| CN | 214081257 | U * | 8/2021 | |
| CN | 214723919 | U * | 11/2021 | |
| CN | 216608880 | U * | 5/2022 | B25C 1/06 |
| CN | 118269041 | A * | 7/2024 | |
| EP | 2607022 | A2 * | 6/2013 | B25C 1/06 |
| GB | 2171351 | A | 8/1986 | |
| WO | WO-2011157776 | A2 * | 12/2011 | B25C 1/00 |

* cited by examiner

DRIVING MECHANISM AND NAIL GUN HAVING SAME

CROSS-REFERENCE TO RELATED PATENT APPLICATIONS

This application is a continuation application of International Patent Application No. PCT/CN2022/101892, filed Jun. 28, 2022, which itself claims priority to Chinese Patent Application No. 202111431425.4, filed Nov. 29, 2021, which are hereby incorporated herein in their entireties by reference.

FIELD OF THE INVENTION

This invention relates generally to nail guns, and more particularly to a nail driving mechanism and a nail gun having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

A nail gun is a fastening tool that is mostly used in construction. Currently, a widely used nail gun is an electric nail gun powered with lithium batteries. This nail gun is driven to push a piston by a drive motor and a corresponding transmission structure, and then the piston compresses a spring to store energy. When firing nails, the piston does work instantaneously under an action of spring force. The striker arranged on the piston strikes the nail to achieve nail firing.

The spring used in the nail gun is usually an independent single spring. When the spring force required for nail firing is relatively large, there are two improvement measures: the first is to increase the wire diameter of the single spring (thicker), but this directly affects the speed of the spring, which reduce the force of the striker hitting the nail, resulting in poor nail firing effect. The second is to keep the wire diameter of a single spring from increasing, but to increase the pitch or reduce the middle diameter of the spring. Although this method can increase the spring force to a certain extent, it can only increase a certain amount of spring force in a small range and cannot increase the span of the spring force. Therefore, it may not be able to meet the requirements for larger spring force. In addition, the second method seriously reduces the lifespan of the spring and increases the cost of maintenance.

Therefore, a heretofore unaddressed need exists in the art to address the aforementioned deficiencies and inadequacies.

SUMMARY OF THE INVENTION

One of the objectives of this invention is to provide a nail driving mechanism and a nail gun having the same to solve the above problems.

In one aspect, the invention relates to a driving mechanism used for a nail gun. The driving mechanism comprises a driving force supply unit, which comprises a frame structure having a front limiting seat and an opposite, rear limiting seat; a piston movably arranged between the front limiting seat and the rear limiting seat in the frame structure; a striker co-movably connected to the piston such that the nail striking member operably moves backward and forward through the front limiting seat the frame structure; and a spring assembly disposed between the piston and the rear limiting seat in the frame structure and configured such that when the piston is driven to move backward in the frame structure, the spring assembly is pushed into a contract state to store energy therein, and when the piston is free, the spring assembly expands to release the stored energy therein to push the piston to move forward in the frame structure so that the striker is co-moved therewith to strike a nail out of a muzzle.

The spring assembly comprises a plurality of springs sheathed together sequentially, and wherein helical directions of two adjacent springs are opposite.

In one embodiment, the driving force supply unit further comprises a guide rod fixedly attached onto the front limiting seat and the rear limiting seat, wherein all the springs are sleeved on the guide rods, and wherein the piston is movably mounted on the guide rod.

In one embodiment, two ends of each spring abut against the piston and the rear limiting seat, respectively, and wherein the centerlines of all the springs coincide with the centerlines of the guide rod.

In one embodiment, the rear limiting seat comprises a rear limiting multi-stage boss portion, wherein the rear limiting multi-stage boss portion includes a plurality of bosses arranged in sequence, and two adjacent bosses are used to limit one of the springs, wherein each boss has a lateral surface for supporting and limiting one of the springs, and a top surface for abutting against another one of the springs.

In one embodiment, the piston comprises a main body; a front limiting multi-stage boss portion formed on the main body; a striker mounting portion formed on a top side of the main body; a first thrust portion and a second thrust portion formed on the bottom side of the main body, wherein the first thrust portion extends from the main body toward a nail firing direction, the second thrust portion extends from the main body in a direction substantially perpendicular to the extension direction of the first thrust portion; a first piston protection member and the second piston protection member configured to protect the first thrust portion and the second thrust portion, respectively and a through hole defined through a central portion of the front limiting multi-stage boss portion and a central portion of the main body for moveable receiving the guide rod.

In one embodiment, the front limiting multi-stage boss portion includes a plurality of bosses arranged in sequence, and two adjacent bosses are used to limit one of the springs, wherein each boss has a lateral surface for supporting and limiting one of the springs, and a top surface for abutting against another one of the springs.

In one embodiment, the driving mechanism further comprises a driving unit is arranged under the driving force supply unit and configured to drive the driving force supply unit to provide force for nailing.

In one embodiment, the driving unit comprises a push member operably coupled with the piston, a drive motor configured to drive the push member, and a one-way bearing configured to limit the driving motor to rotate only in one direction.

In one embodiment, the pushing member is configured to push the piston to move towards an energy storage direction to compress the springs of the spring assembly to store energy therein.

In one embodiment, the pushing member is a cam having a wheel body, a first pushing protrusion and a second pushing protrusion disposed apart on the wheel body facing the piston.

In one embodiment, the first pushing protrusion and the second pushing protrusion are cylindrical, and the first pushing protrusion has a height higher than that of the second pushing protrusion.

In one embodiment, when the wheel body is driven to rotate, the rotation of the wheel body causes the first pushing protrusion and the second pushing protrusion to move in an arc path accordingly, the movement of the first pushing protrusion and the second pushing protrusion in turn causes the piston to move towards the rear limiting seat, thereby compressing the spring assembly in the energy storage direction to store energy accordingly.

In one embodiment, in operation, the pushing member rotates under driving of the driving motor, with the rotation of the pushing member, the second pushing protrusion first rotates to the second thrust portion of the piston, and contacts with the second thrust portion of the piston to abut against each other, meanwhile the pushing member continues to rotate, the second pushing protrusion makes an arc-shaped movement toward the energy storage direction, and applies an arc-shaped pushing force toward the energy storage direction to the piston through the second thrust portion, under the action of the pushing force the piston moves along the guide rod along the energy storage direction, thereby compressing the springs to perform energy storage in a first stage of energy storage, and wherein when the second pushing protrusion rotates to the maximum stroke along the energy storage direction, the first stage of energy storage is completed, and then enters a second stage of energy storage.

In one embodiment, in second stage of energy storage, the pushing member continues to rotate, and the second pushing protrusion rotates accordingly and breaks away from the second thrust portion of the piston, meanwhile, the first pushing protrusion rotates to the first thrust portion of the piston and contacts with the first thrust portion second stage of energy storage to abut against each other, and then, the first push protrusion pushes the piston further in the energy storage direction in the same way, until the first push protrusion rotates along the energy storage direction to the maximum stroke, completing the second stage of energy storage.

In one embodiment, after the second stage of energy storage is completed, nailing is performed, wherein the driving motor drives the pushing member to continuously rotate, and the first pushing protrusion rotates accordingly and breaks away from the first thrust portion of the piston, at this moment, the first pushing protrusion and the second pushing protrusion are located outside the moving path of the piston, such that the piston, under the elastic force of the spring assembly, moves towards the nail firing direction until the piston strikes the front limiting seat to complete the nail firing process.

In one embodiment, the lengths, middle diameters, wire diameters, and pitches of the plurality of springs decrease sequentially from outside to inside.

In one embodiment, the spring assembly comprises an inner spring sleeving on the guide rod, and an outer spring sleeving on the inner spring, wherein the inner spring has a length in a range of about 110-125 mm, and an elastic constant in a range of about 2.45-2.89 N/mm, and wherein the outer spring has a length in a range of about 130-150 mm, and an elastic constant in a range of about 2.5-2.9 N/mm.

In one embodiment, the driving force supply unit further comprises a plurality of spring buffer pieces arranged corresponding to the plurality of springs one by one, and arranged between the springs and the piston, for buffering the impact of the springs.

In another aspect, the invention relates to a nail gun for nailing comprising the driving mechanism as disclosed above.

According to embodiments of the invention, the spring assembly of the driving force supply unit for the nail gun includes at least two springs that are sheathed together sequentially, so the spring assembly can provide a spring force greater than that of a single spring, thereby satisfying the need for greater spring force. In addition, this arrangement can also avoid the problem of insufficient nail force caused by increasing the spring force by increasing the wire diameter of the spring, and can also avoid the problem of which increasing the spring force by increasing the pitch of the spring or reducing the middle diameter of the spring still does not meet the need and seriously reduces the lifespan of the spring.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
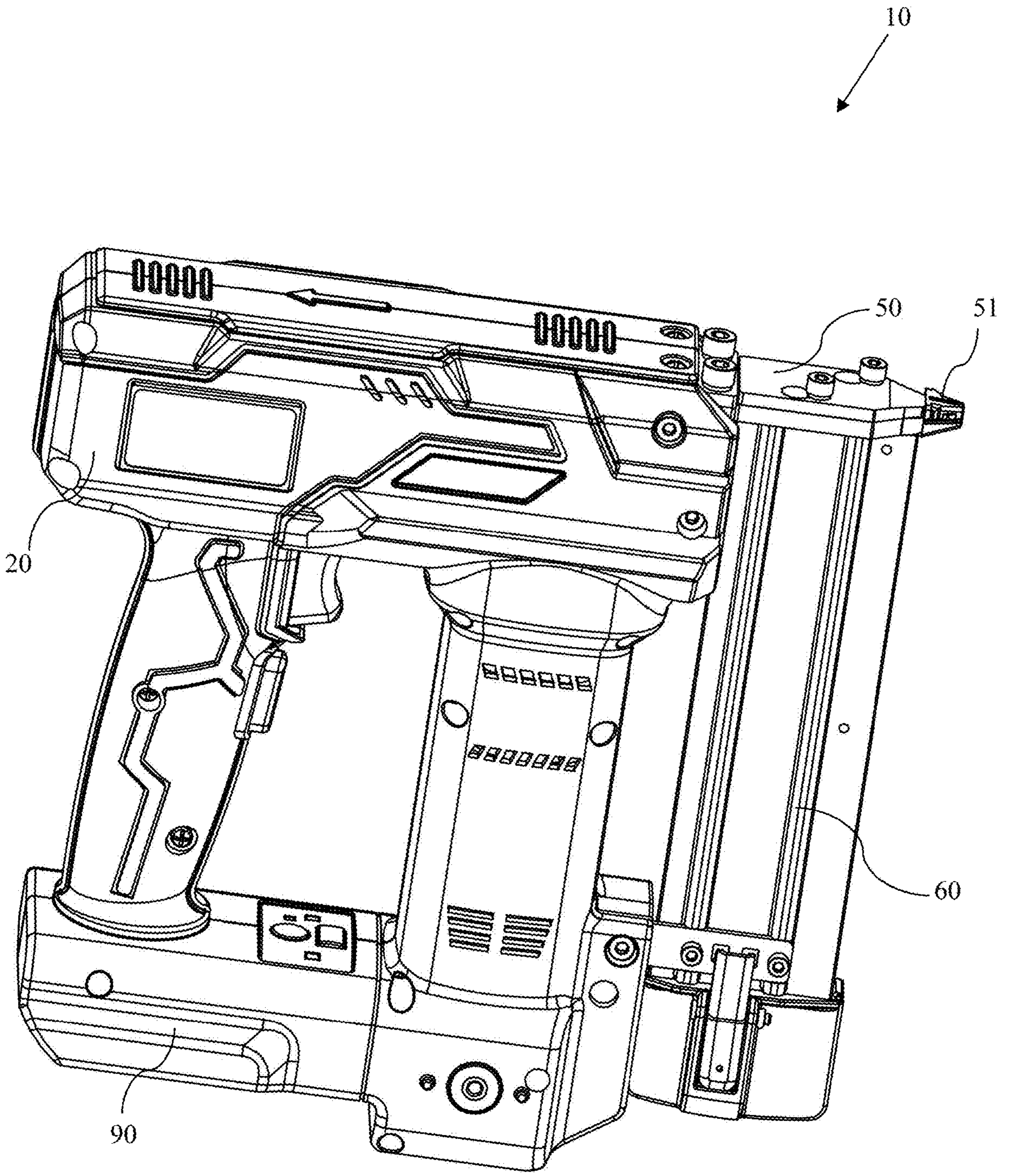
FIG. 1 shows schematically a perspective view of a nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about" "substantially" or "approximately" can be inferred if not expressly stated.

As used in this specification, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to a force supply mechanism and a nail gun with the force supply mechanism. Embodiments of the invention are now described in conjunction with the accompanying drawings in FIGS. 1-15.

Figure 2:
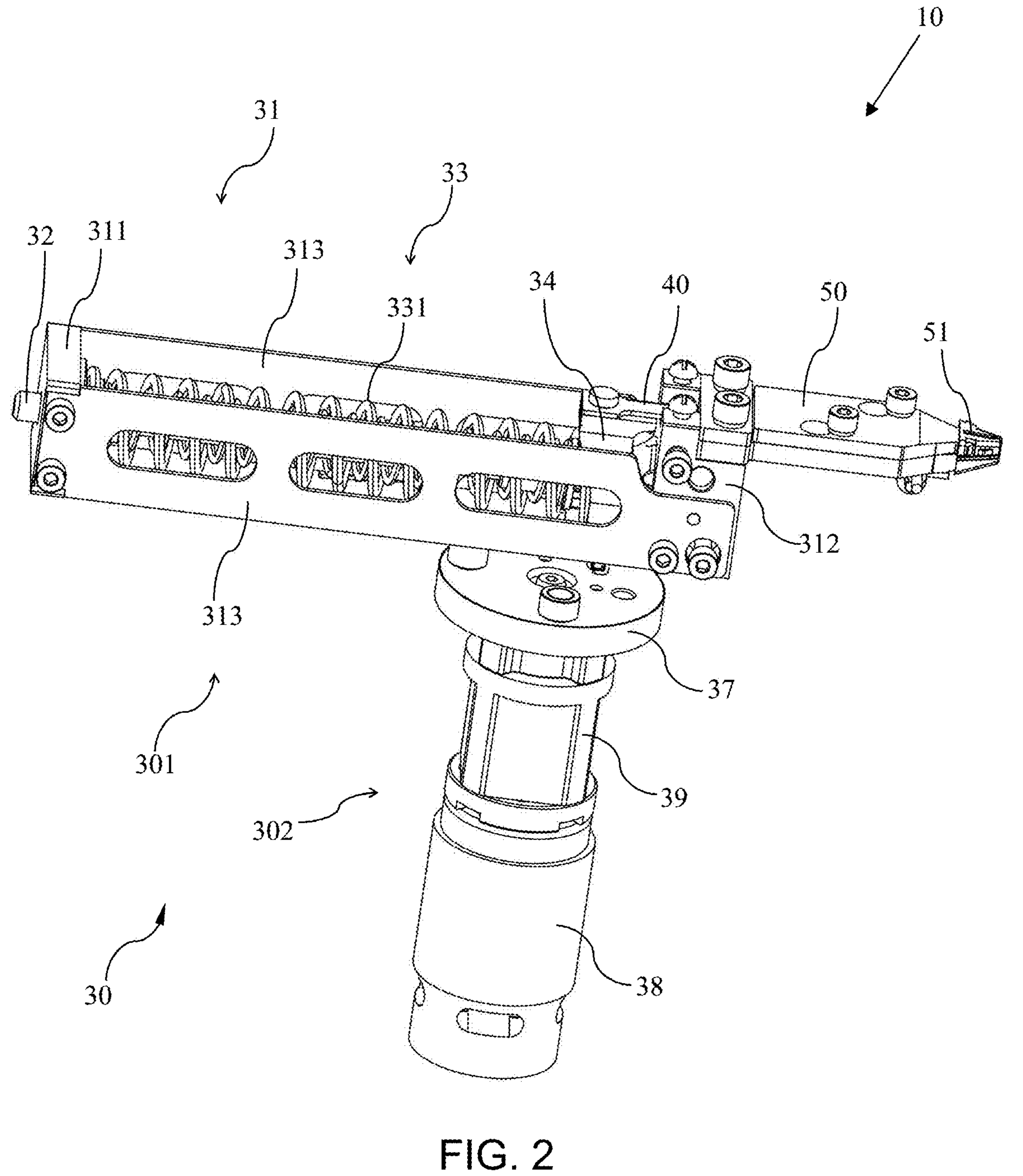
FIG. 2 shows schematically a perspective view of the nail gun shown in FIG. 1 after removing the housing and the nail magazine assembly.
Figure 3:
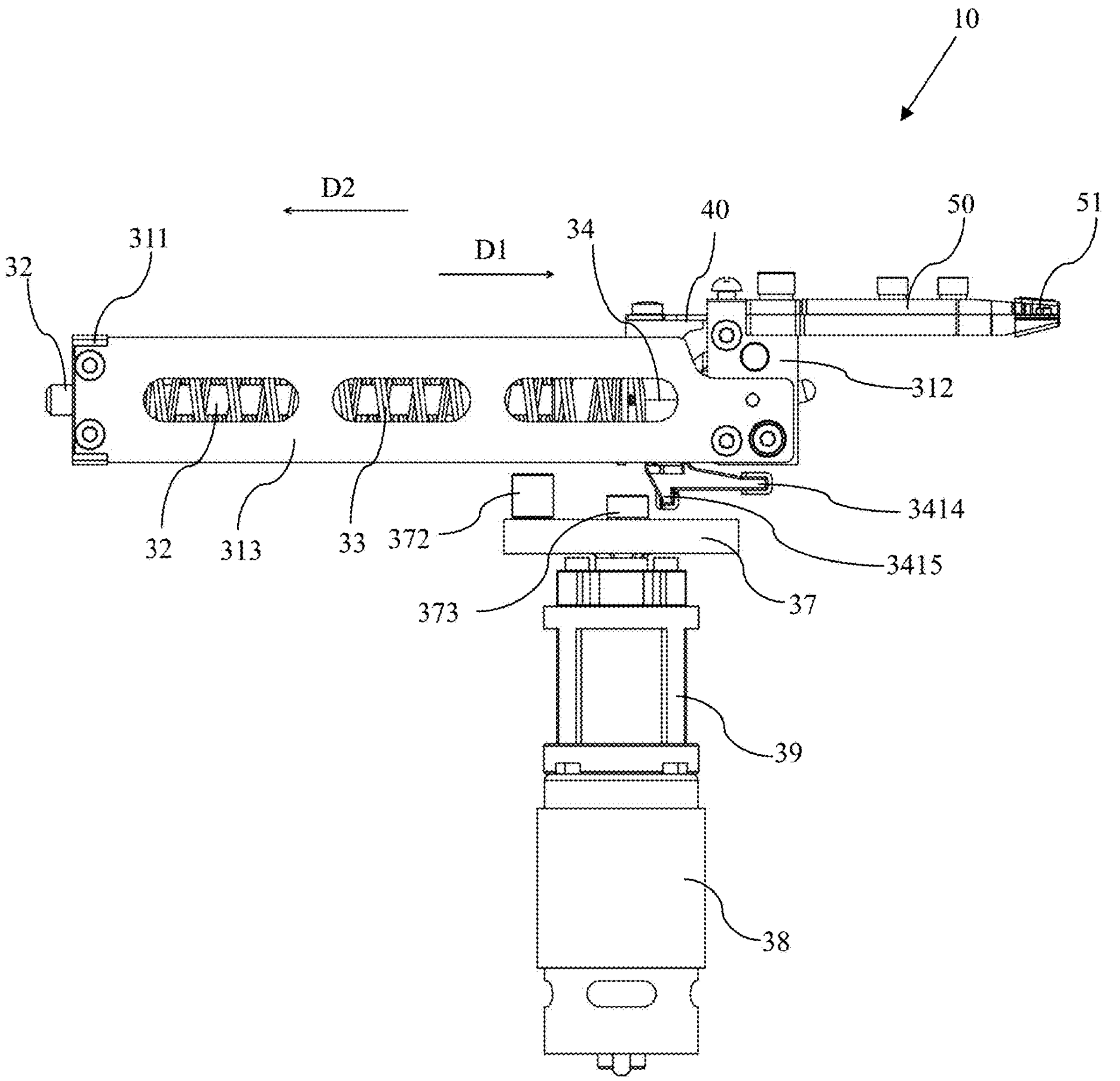
FIG. 3 shows schematically a front view of the nail gun shown in FIG. 2.

Referring to FIGS. 1-3, a nail gun 10 is shown according to one embodiment of the invention. In the exemplary embodiment, the nail gun 10 includes a housing 20, a nail driving mechanism 30, a battery module 90, a muzzle 50 and a nail magazine assembly 60.

The muzzle 50 includes a firing channel with an injection port 51 at the front end for firing nails. The rear end of the muzzle 50 is coupled with the nail driving mechanism 30 for driving the nails to fire. The nail magazine assembly 60 is adapted for accommodating nails, assembled below the muzzle 50 and operably coupled to the muzzle 50 for conveying nails. The nail magazine assembly 60 has a nail conveying channel in communication with the firing channel for conveying the nails. In operation, the nails accommodated in the nail conveying channel are sequentially sent into the firing channel.

The exterior of the nail driving mechanism 30 is wrapped with a casing 20, and a handle extends from the rear of the casing 20. The lithium battery module 90 for powering the nail driving mechanism 30 is installed at the lower end of the handle. The upper end of the handle is provided with a switch for controlling the nail driving mechanism 30. The various parts of the housing 20 are assembled by bolts.

The nail driving mechanism 30 is configured to provide power for nail firing and includes a driving force supply unit 301 for a nail gun and a driving unit 302.

Referring to FIGS. 2-9, the driving force supply unit 301 for the nail gun 10 is schematically shown according to in an embodiment of the invention. The driving force supply unit 301 includes a frame structure 31, a guide rod 32, a spring assembly 33, a piston 34, a pair of rolling elements 35, a spring buffer plate 36, a striker (also called a nail striking member) 40 and a buffer element 41.

The frame structure 31, also called a regulation frame 31 hereinafter in the disclosure, is configured to regulate and limit the piston 34 so that the piston 34 can only move along a predetermined reciprocating direction. The reciprocating motion directions include a nail firing direction and an energy storage direction. As shown in FIG. 3, the direction indicated by the arrow D1 is the nail firing direction, and the direction indicated by the arrow D2 is the energy storage direction.

The regulating frame 31 has a rear limiting seat 311, a front limiting seat 312 opposite to the rear limiting seat 311, and two regulating plates 313 disposed between the rear limiting seat 311 and the front limiting seat 312.

The guide rod 32 is fixedly combined with the front limiting seat 312 and the rear limiting seat 311 and extends along the horizontal direction. In the exemplary embodiment, the guide rod 32 is a round rod.

As shown in FIGS. 5-8 and 10, the rear limiting seat 311 has a rear limit block 3111 and a rear limiting multi-stage boss portion 3112 attached to the rear limit block 3111. The center of the rear limiting block 3111 has a through channel 31111 that is compatible with the guide rod 32 and extends along the horizontal direction.

Figure 10:
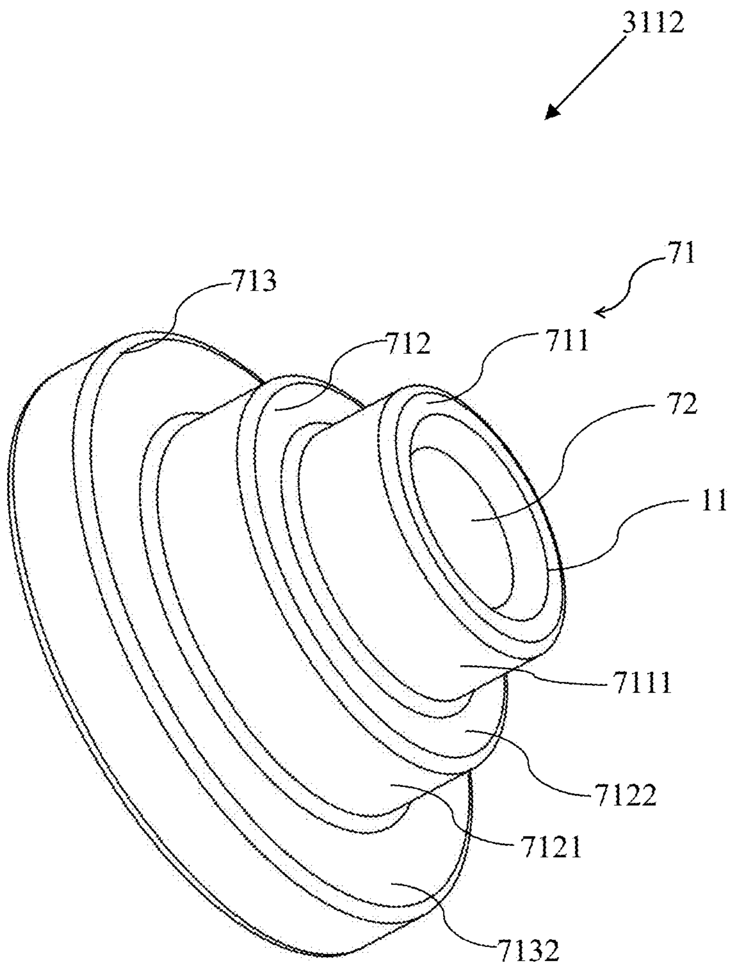
FIG. 10 shows schematically a perspective view of a rear limiting multi-stage boss portion for the nail gun according to one embodiment of the invention.

Referring to FIG. 10, the rear limiting multi-stage boss portion 3112 is schematically shown according to one embodiment of the invention. In the exemplary embodiment, the rear limiting multi-stage boss portion 3112 is fixedly combined with (e.g., attached onto) the rear limiting block 3111 and includes a plurality of rear limiting bosses 71 orderly formed in one on another.

In the exemplary embodiment shown in FIG. 10, the plurality of rear limiting bosses 71 includes a first rear limiting boss 711, a second rear limiting boss 712 and a third rear limiting boss 713 formed such that the first rear limiting boss 711 is protruded from the second rear limiting boss 712 that in turn, is protruded from the third rear limiting boss 713. All the first rear limiting boss 711, the second rear limiting boss 712 and the third rear limiting boss 713 are cylindrical bosses and coaxially arranged in one on another.

The first rear limiting boss 711 has a first rear lateral surface 7111, and the first rear lateral surface 7111 is an annular surface. The second rear limiting boss 712 has a second rear lateral surface 7121 and a second rear top surface 7122 perpendicular to each other, and the second rear top surface 7122 is vertically connected to the first rear lateral surface 7111. Both the second rear lateral surface 7121 and the second rear top surface 7122 are annular surfaces. The third rear limiting boss 713 has a third rear top surface 7132, and the third rear top surface 7132 is vertically connected to the second rear lateral surface 7121. The third rear top surface 7132 is an annular surface. The central axes of the three rear limiting bosses 71 coincide with the central axis of the rear limiting block 3111. In the exemplary embodiment, the rear limiting multi-stage boss portion 3112 is integrally formed. The rear limiting multi-stage boss portion 3112 has a mounting channel 72 defined in the central portion of the rear limiting multi-stage boss portion 3112, along the central axes of the three rear limiting bosses 71.

Figure 7:
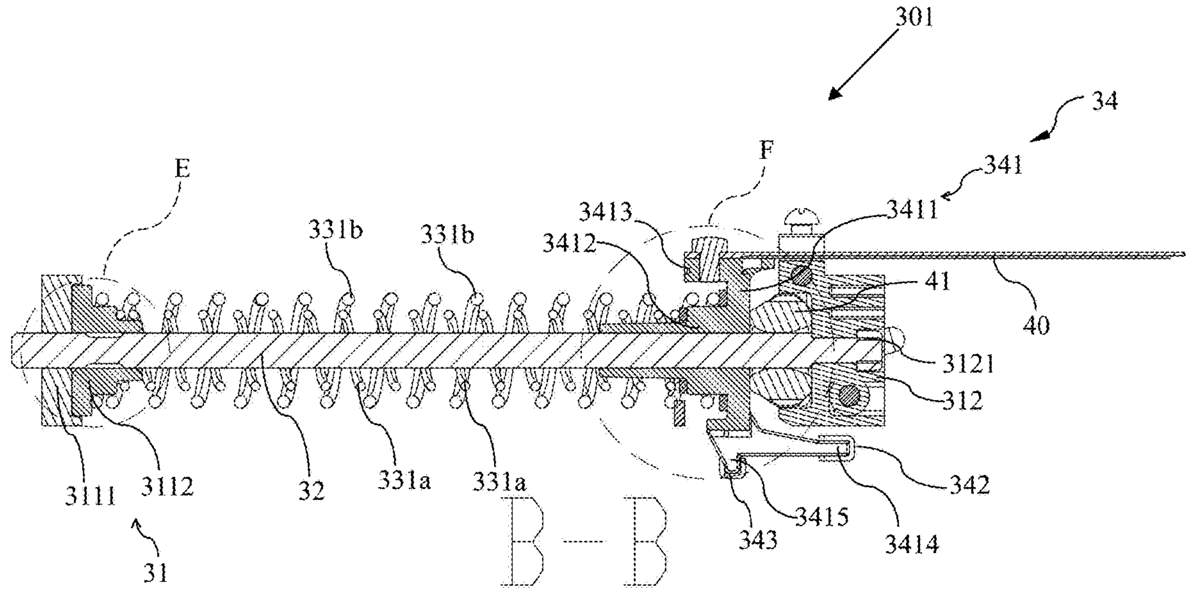
FIG. 7 shows schematically a B-B sectional view of FIG. 6.
Figure 8:
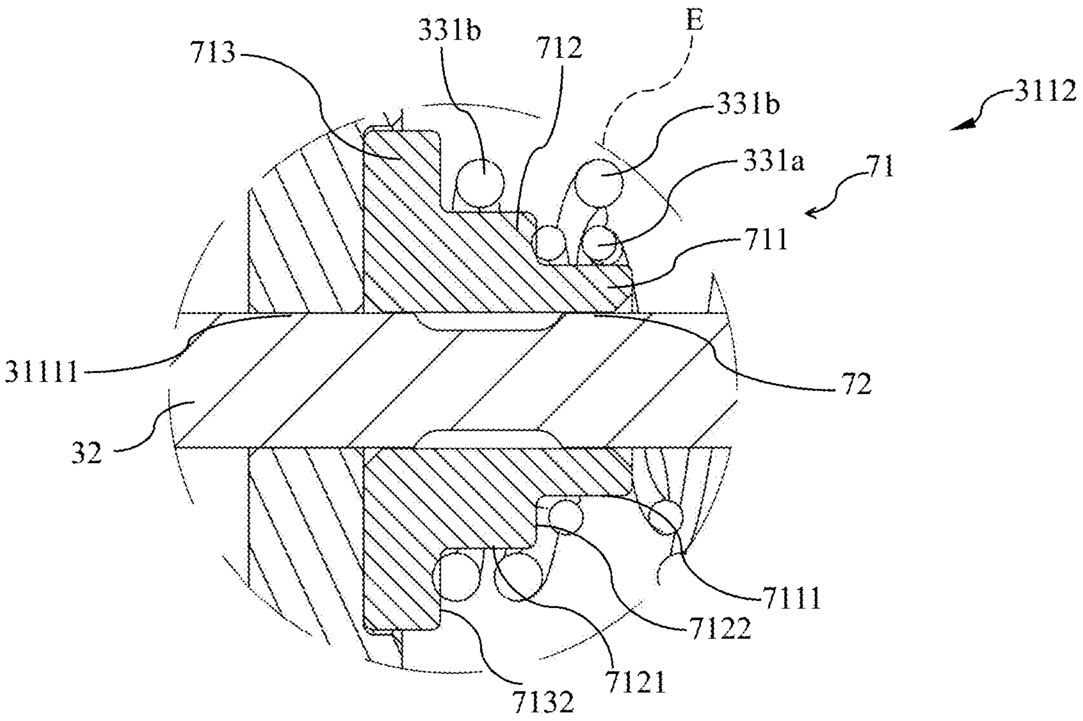
FIG. 8 shows schematically a partially enlarged view of part E in FIG. 7.

As assembled, one end of the guide rod 32 passes through and is received in the mounting channel 72 and the through channel 31111, to be fixedly attached onto the rear limiting multi-stage boss portion 3112 and the rear limiting block 3111. Another end of the guide rod 32 is fixedly combined with the front limiting seat 312 through a mounting hole 3121 defined therein (FIG. 7). The central axis of the guide rod 32 coincides with the central axis of the mounting channel 72 and the through channel 31111 of the rear limiting seat 311 and the central axis of the mounting hole 3121 of the front limiting seat 312.

The two regulation plates 313 are configured to regulate the motion direction of the piston 34. As shown in FIGS. 2-3, the two regulating plates 313 are arranged in parallel, and both extend along the horizontal direction. Two ends of each regulating plate 313 are detachably attached on the rear limiting block 3111 and the front limiting seat 312 respectively by, for example, screws, or other connecting means. In some embodiments, the rear limiting seat 311, the front limiting seat 312 and the two regulating plates 313 are assembled to form an open frame structure, as shown in FIG. 2.

Figure 4:
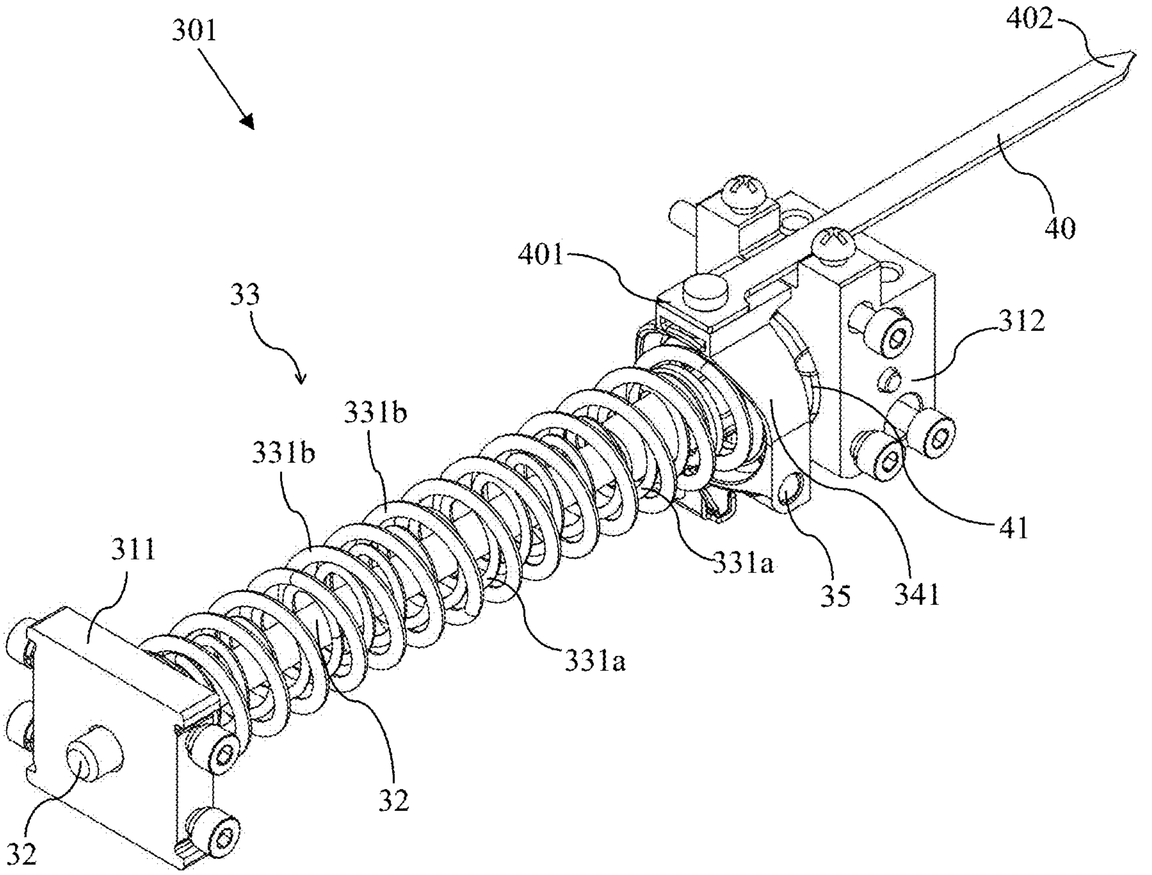
FIG. 4 shows schematically a perspective view of a driving force supply unit for the nail gun according to one embodiment of the invention.

The spring assembly 33 is moveably installed between the piston 34 and the rear limiting seat 311 in the regulating frame structure 31 for providing the driving force for nail firing, as shown in FIGS. 2-4. The spring assembly 33 has at least two springs 331 for providing the nail driving force. The at least two springs 331 are sheathed together and sleeved on the guide rod 32 in turn. The helical directions of the adjacent two springs 331 are oppositely aligned. The centerlines of all the springs 331 coincide with the centerlines (axis) of the guide rods 32. That is, all the guide rods 32 and the springs 331 are co-axially assembled. The length, middle diameter, wire diameter and pitch of the at least two springs 331 are all decreased from outside to inside. In the exemplary embodiment shown in FIGS. 2-9, the at least two springs 331 include two force supply springs, i.e., an inner force supply spring 331*a* sleeved on the guide rod 32 and an outer force supply spring 331*b* sleeved on the inner force supply spring 331*a*.

Figure 9:
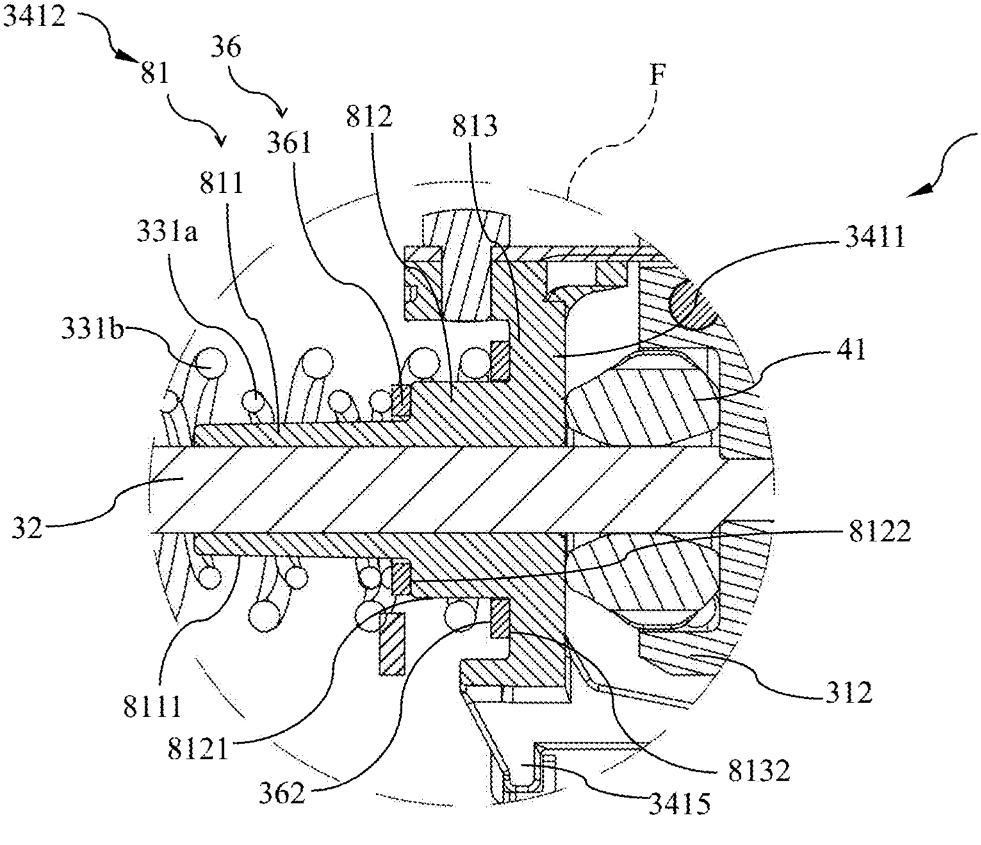
FIG. 9 shows schematically a partially enlarged view of part F in FIG. 7.

Referring to FIGS. 7, 9 and 11, a perspective view of the piston 34 is schematically shown according to one embodiment of the invention. In the exemplary embodiment, the piston 34 is sleeved on the guide rod 32 and arranged in the regulating frame structure 31 and movably between the front limiting seat 311 and the rear limiting seat 312. The piston 34 includes a piston body 341, a first piston protection member 342 and a second piston protection member 343.

The piston body 341 includes a main body 3411, a front limiting multi-stage boss portion 3412, a striker mounting portion 3413, a first thrust portion 3414, a second thrust portion 3415 and a through hole portion 3416. In certain embodiments, the piston body 341 is made of aluminum, alloy, or any suitable materials.

The front limiting multi-stage boss portion 3412 is fixedly combined with the main body 3411 and includes a plurality of front limiting bosses 81 arranged in sequence. In the exemplary embodiment shown in FIGS. 7, 9 and 11, the front limiting multi-stage boss portion 3412 includes three front limiting bosses 81, which are respectively referred to, from rear to front, as the first front limiting boss 811, the second rear limiting boss 812 and the third rear limiting boss 813.

The first front limiting boss 811 is cylindrical and has a first front lateral surface 8111, and the first front lateral surface 8111 is an annular surface.

The second front limiting boss 812 has a second front lateral surface 8121 and a second front top surface 8122 perpendicular to the second front lateral surface 8121, and the second front top surface 8122 is vertically connected to or extending from the first front lateral surface 8111. In the exemplary embodiment shown in FIGS. 11A-11B, the second front limiting boss 812 includes a plurality of positioning pieces 8123. The plurality of positioning pieces 8123 are evenly disposed along the radial direction on the perimeter of the first front limiting boss 811, i.e., arranged around the first front limiting boss 811, and vertically connected to the outer wall surface, i.e., the first front lateral surface 8111 of the first front limiting boss 811. In one embodiment, each positioning piece 8123 is a cuboid-like tab or block attached to or projecting from the first front lateral surface 8111 of the first front limiting boss 811 and has a top side 81231 and an outer side 81232 away from the first front lateral surface 8111 of the first front limiting boss 811. All the top sides 81231 are collectively as the second front top surface 8122, and all the outer sides 81232 are collectively as the second front lateral surface 8121.

The third front limiting boss 813 has a third front top surface 8132. In one embodiment, the third front top surface 8132 is vertically connected to or extending from the second front lateral surface 8121. The third front limiting boss 813 includes a plurality of positioning blocks 8133. The plurality of positioning blocks 8133 are evenly disposed along the radial direction on the perimeter of the first front limiting boss 811, that is, arranged around the first front limiting boss 811. Each positioning block 8133 has a top surface 81331. All the top surfaces 81331 of the plurality of positioning blocks 8133 are collectively as the third front top surface 8132.

The number of the positioning blocks 8133 may be equal to the number of the positioning pieces 8123, or not equal to the number of the positioning pieces 8123. In the exemplary embodiment shown in FIGS. 11A-11B, the number of positioning blocks 8133 is 8, and the number of positioning pieces 8123 is 4, where four of the positioning blocks 8133 are respectively extended from or attached to the four positioning pieces 8123, while each of the other positioning blocks 8133 is extended from or attached to the first front lateral surface 8111 of the first front limiting boss 811 and located between two adjacent positioning pieces 8123.

The through hole portion 3416 is a through hole defined passing through the center of the front limiting multi-stage boss portion 3412 and the center of the main body 3411. The piston 34 is sleeved on the guide rod 32 through the through hole 3416 and can reciprocate and slide along the guide rod 32.

As shown in FIGS. 7-11B, the inner spring 331*a* is engaged with the first rear limiting boss 711 of the rear limiting seat 311 and the first front limiting boss 811 of the piston 34. One end (i.e., rear end) of the inner spring 331*a* is sleeved on the first rear limiting boss 711 and abuts against the second rear limiting boss 712. The other end (front end) of the inner spring 331*a* is sleeved on the first front limiting boss 811 and abuts against the second front limiting boss 812. Specifically, the rear end of the inner spring 331*a* is sleeved on the first rear lateral surface 7111 of the first rear limiting boss 711 and abuts against the second rear top surface 7122 of the second rear limiting boss 712. The front end of the inner spring 331*a* is sleeved on the first front lateral surface 8111 of the first front limiting boss 811 and abuts against the second front top surface 8122 of the second front limiting boss 812.

Through the supporting and limiting functions of the first rear limiting boss 711 and the first front limiting boss 811, the center line (axis) of the inner spring 331*a* is always aligned coincidently with the center line (axis) of the guide rod 32 during the reciprocating movement. During the reciprocating movement of the inner spring 331*a*, the rear end of the inner spring 331*a* never leaves away or disengages from the first rear limiting boss 711, while the front end of the inner spring 331*a* never leaves away or disengages from the first front limiting boss 811.

In addition, the outer spring 331*b* is engaged with the second rear limiting boss 712 of the rear limiting seat 311 and the second front limiting boss 812 of the piston 34. One end (rear end) of the outer spring 331*b* is sleeved on the second rear limiting boss 712 and abuts against the third rear limiting boss 713. The other end (front end) of the outer spring 331*b* is sleeved on the second front limiting boss 812 and abuts against the third front top surface 8132. Specifically, the rear end of the outer spring 331*b* is sleeved on the second rear lateral surface 7121 of the second rear limiting boss 712 and abuts against the third rear top surface 7132 of the third rear limiting boss 713. The front end of the external force supply spring 331*b* is sleeved on the second front lateral surface 8121 of the second front limit boss 812 and abuts against the third front top surface 8132 of the third front limiting boss 813.

Through the supporting and limiting functions of the second rear limiting boss 712 and the second front limiting boss 812, the center line (axis) of the outer spring 331*b* is always aligned coincidently with the center line of the guide rod 32 during the reciprocating movement, and there is no interference between the outer spring 331*b* and the inner spring 331*a*. In addition, during the reciprocating movement of the outer spring 331*b*, the rear end of the outer spring 331*b* never disengages from the second rear limiting boss 712, while the front end never disengages from the second front limiting boss 812.

In certain embodiments, the outer spring 331*b* has the length (free height) in a range of about 130-150 mm, and the elastic coefficient (stiffness) in a range of about 2.5-2.9 N/mm; and the inner spring 331*a* has the length in a range of about 110-125 mm, and the elastic coefficient in a range of about 2.45-2.89 N/mm. It should be noted that other types of springs can also be utilized to practice the invention.

In one exemplary embodiment, the outer spring 331*b* has the wire diameter being about 2.4 mm, the middle diameter being about 20.5 mm, the pitch being about 9.7 mm, the number of effective turns being about 14, the length being about 140 mm, and the elastic coefficient being about 2.7 N/mm; and the inner spring 331*a* has the wire diameter being about 2 mm, the middle diameter being about 14.6 mm, the pitch being about 6.2 mm, the number of effective turns being about 19; the length being about 120 mm; the elastic coefficient being about 2.67 N/mm.

Figure 11A:
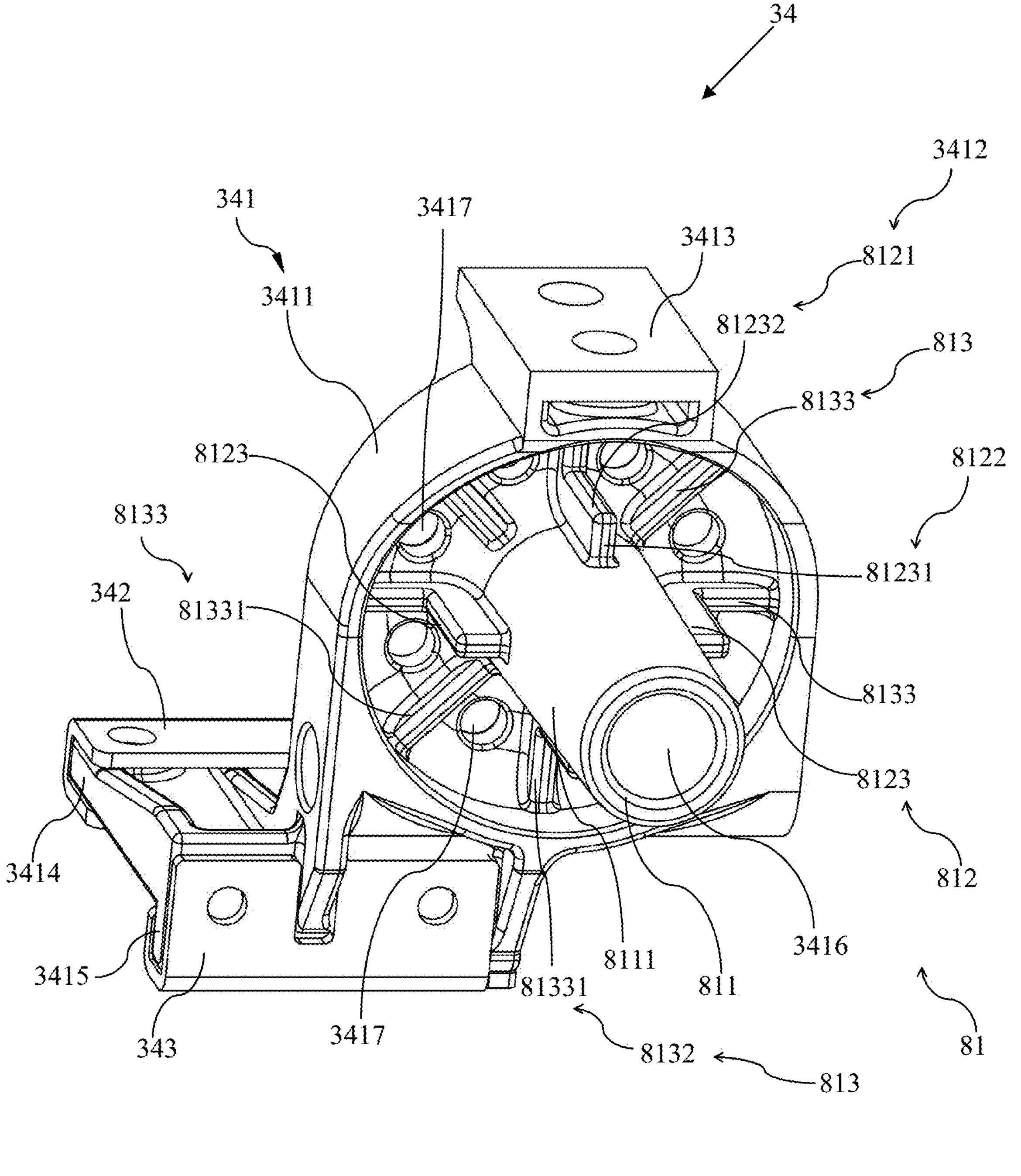
FIG. 11A shows schematically a perspective view of a piston for the nail gun according to one embodiment of the invention.
Figure 11B:
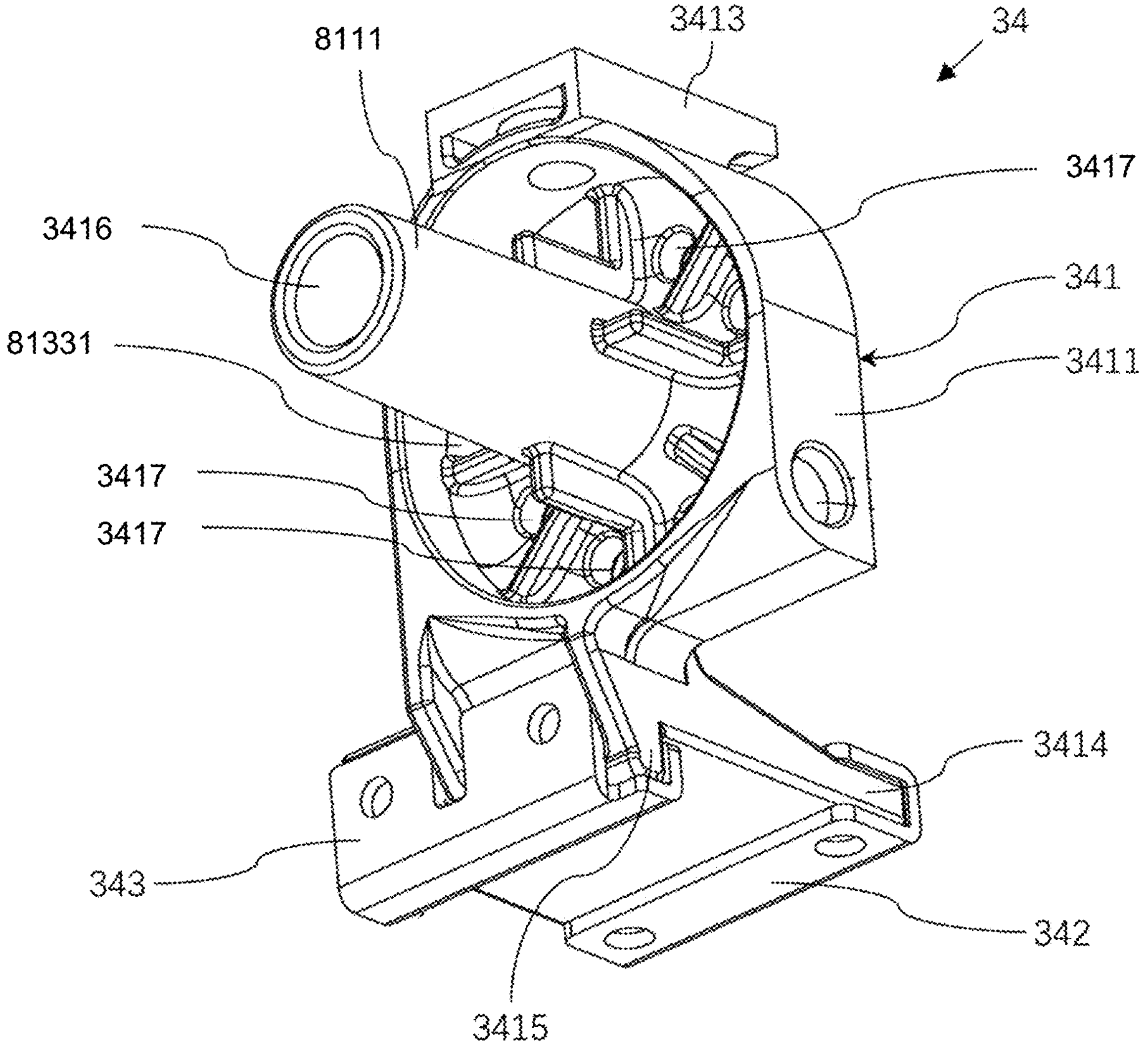
FIG. 11B shows schematically another perspective view of the piston for the nail gun shown in FIG. 11A.
Figure 12:
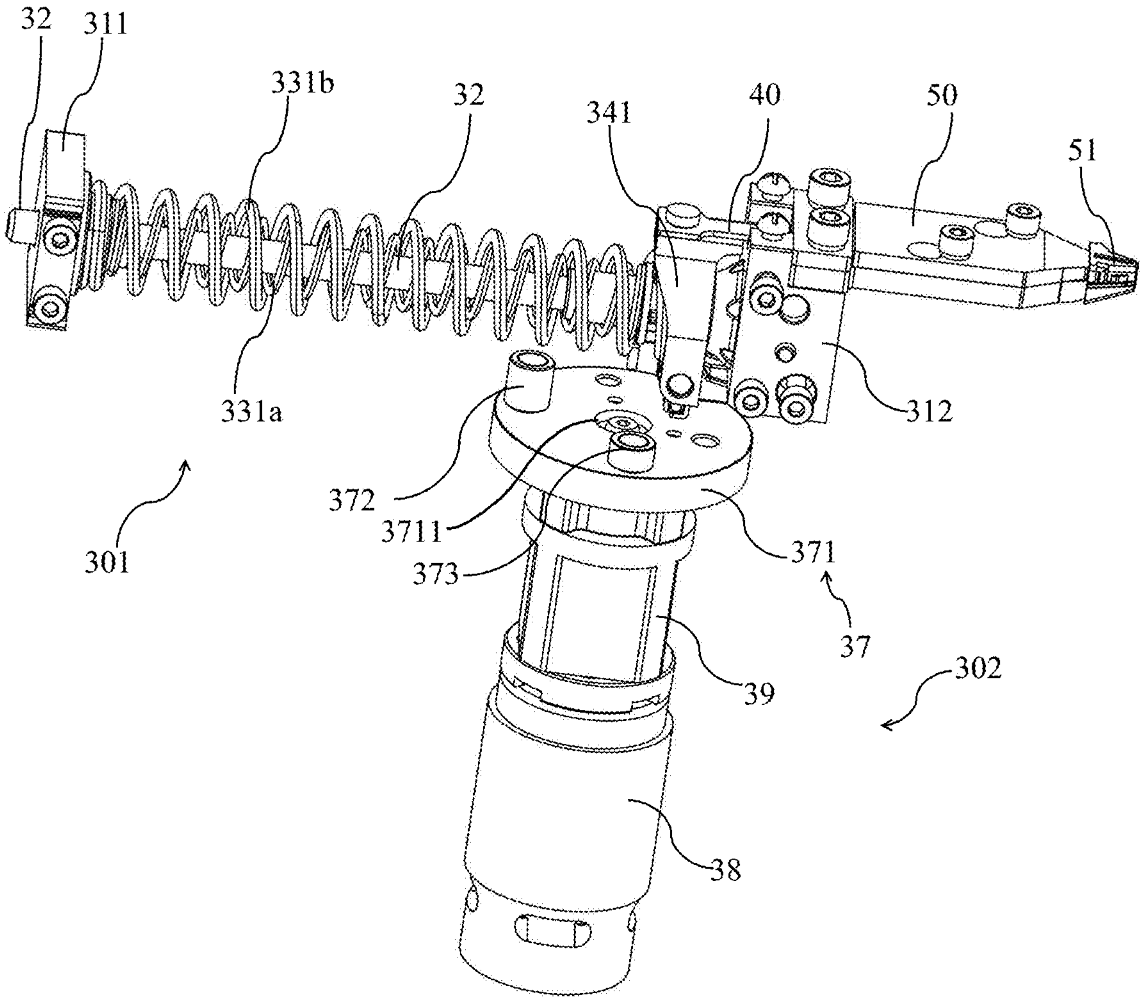
FIG. 12 shows schematically a perspective view of a nail driving mechanism and a muzzle for the nail gun according to one embodiment of the invention.
Figure 13:
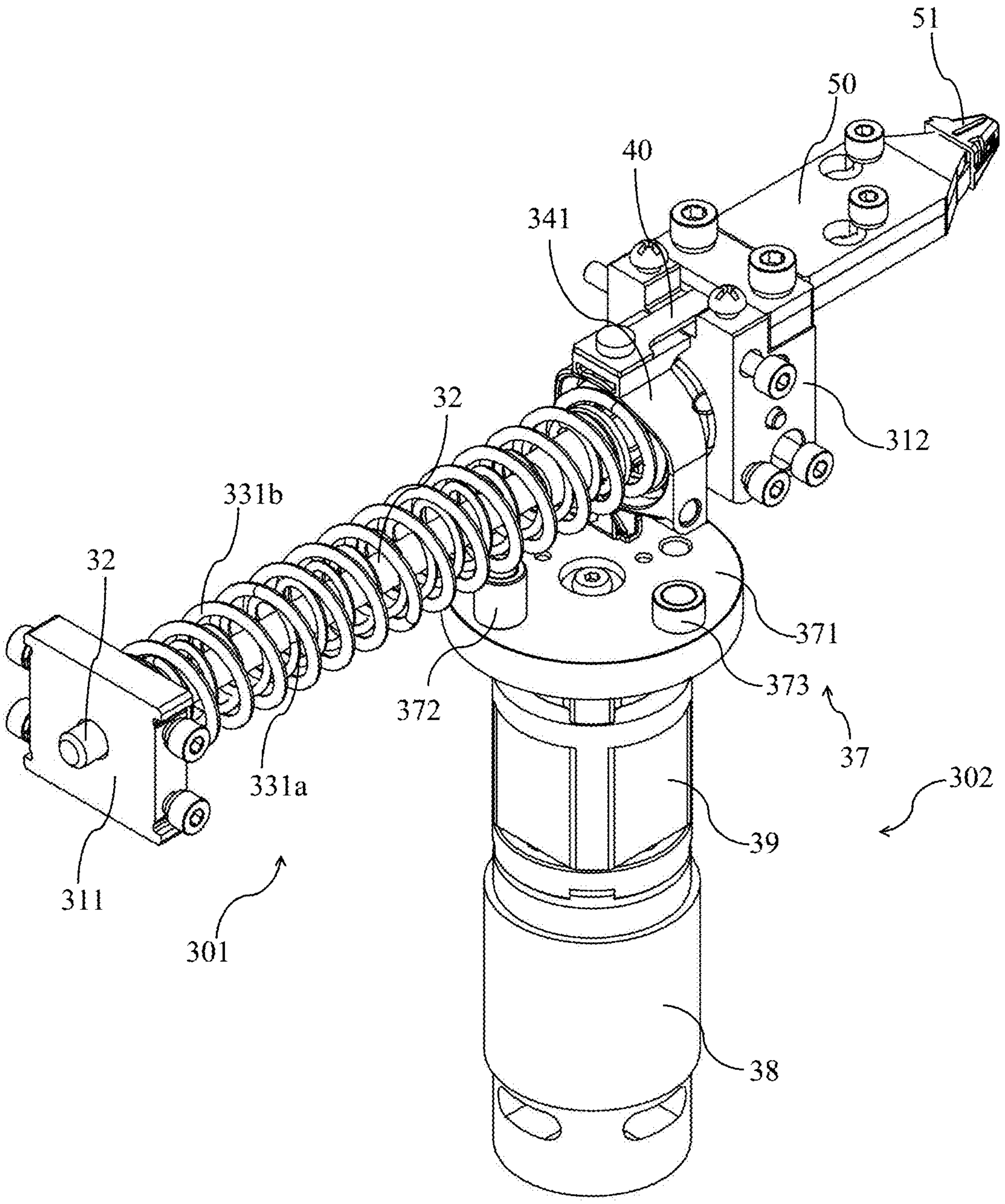
FIG. 13 shows schematically another perspective view of the nail driving mechanism and the muzzle for the nail gun shown in FIG. 12.
Figure 14:
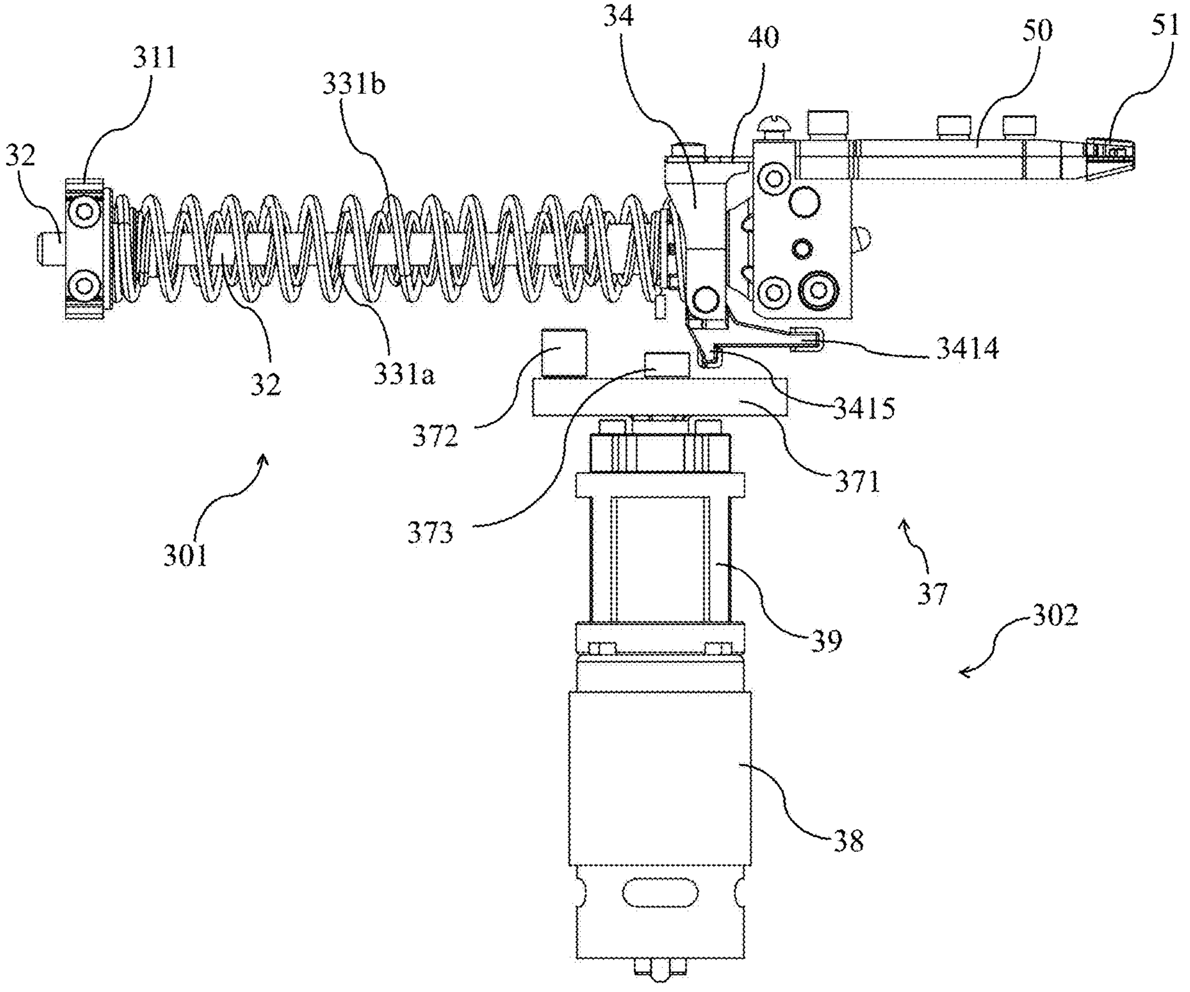
FIG. 14 shows schematically a front view of the nail driving mechanism and the muzzle for the nail gun shown in FIG. 12.
Figure 15:
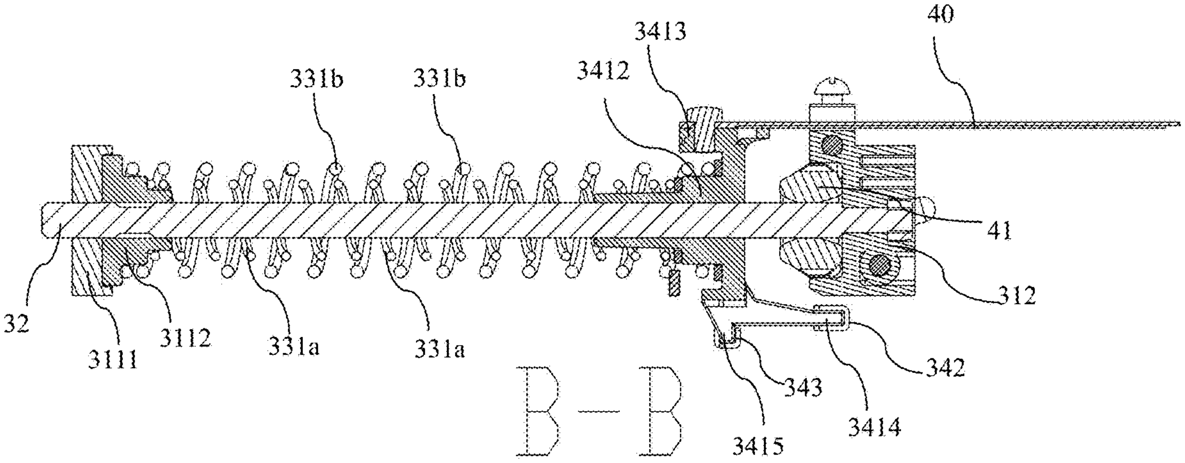
FIG. 15 shows schematically a B-B sectional view of FIG. 7, during the energy storage process of the piston that compresses the spring.

In addition, in the exemplary embodiment shown in FIGS. 11A-11B, the main body 3411 has eight exhausting through holes 3417 defined therein for operably reducing wind resistance when the piston 34 moves. Each exhausting through hole 3417 is a circular (or other geometrical) through hole with its extension direction parallel to the length direction of the guide rod 32. That is, the extension direction of the through hole 3417 is consistent with the predetermined reciprocating motion directions. The eight exhausting through holes 3417 are evenly distributed around the through hole 3416, so that the piston 34 is evenly stressed during the movement. It should be noted that other number of exhausting through holes can also be utilized to practice the invention.

As shown in FIGS. 11A-11B, the striker mounting portion 3413 is formed at the top center of the main body 3411 for mounting the striker 40.

Further referring to FIGS. 3, 7, 9 and 11A-11B, the first thrust portion 3414 and the second thrust portion 3415 are used to cooperate with the driving unit 302 for pushing the piston 34 toward the energy storage direction. The first thrust portion 3414 and the second thrust portion 3415 are both formed on the bottom side of the main body 3411, which is proximate to the driving unit 302. The striker mounting portion 3413 and both the first thrust portion 3414 and the second thrust portion 3415 are respectively located on top and bottom sides of the main body 3411. The first thrust portion 3414 extends from the main body 3411 toward the direction of nail firing, the second thrust portion 3415 extends from the main body 3411 toward the driving unit 302, and the second thrust portion 3415 is substantially perpendicular to the first thrust portion 3414, as shown in FIGS. 3, 7 and 11A-11B.

The first piston protection member 342 and the second piston protection member 343 are configured to protect the first thrust portion 3414 and the second thrust portion 3415 respectively. As shown in FIGS. 11A-11B, in the exemplary embodiment, the shape of the first piston protection member 342 matches the first thrust portion 3414, and the first piston protection member 342 wraps on the first thrust portion 3414. The shape of the second piston protection member 343 matches the second thrust portion 3415, and the second piston protection member 343 wraps on the second thrust portion 3415. The first piston protection member 342 and the second piston protection member 343 are made of iron, alloy, or any other wear-resistant materials, so they are more wear-resistant.

Figure 6:
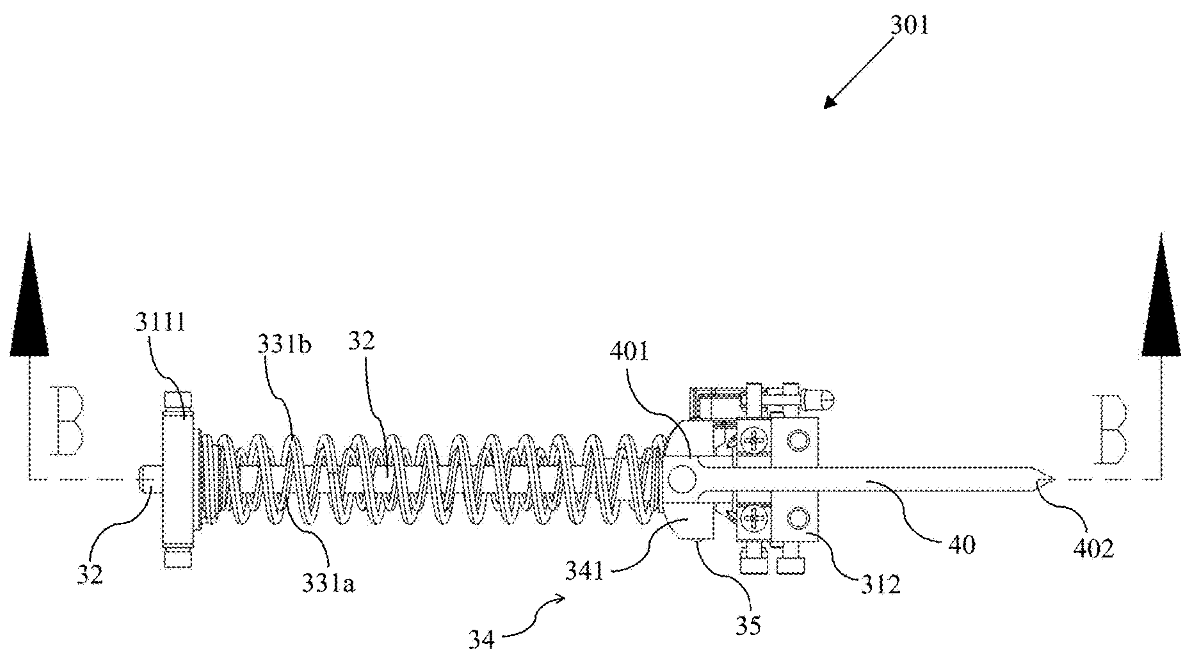
FIG. 6 shows schematically a top view of the driving force supply unit shown in FIG. 4.

As shown in FIGS. 4 and 6, a pair of rolling elements 35 are rotatably fitted on the main body 3411 and located at two sides of the main body 3411. Each rolling element 35 is a spherical steel ball rotatably protruding from the side of the main body 3411. The pair of rolling elements respectively abuts against the inner surfaces of the regulating plates 313 on the corresponding sides facing the piston 34. As such, the two regulating plates 313 are not in direct contact with the piston 34, thereby reducing the frictional force on the piston 34 when it moves. In addition, the two regulating plates 313 can also function as a limit to the piston 34 to prevent the piston 34 from rotating around the guide rod 32.

Referring to FIGS. 12-15, the nail driving mechanism and the muzzle are schematically shown according to embodiments of the invention.

In this exemplary embodiment, the driving unit 302 is arranged under the driving force supply unit 301 of the nail gun 10 and configured to drive the driving force supply unit 301 for the nail gun 10 to generate the power for nailing. The driving unit 302 includes a push member 37, a drive motor 38 and a one-way bearing 39.

The driving motor 38 is coupled with the battery module 90, such as a lithium battery module, and configured to drive, under the power supply of the battery module 90, the pushing member 37 to rotate, the rotation of the pushing member 37 in turn pushes the piston 34 to move.

The pushing member 37 is configured to push the piston 34 to move towards the spring assembly 33, that is, to move towards the energy storage direction, so as to compress the first force supply spring 331*a* and the second force supply spring 331*b* to store energy therein.

The pushing member 37 in this exemplary embodiment is a cam. The cam has a wheel body 371, a first pushing protrusion 372 and a second pushing protrusion 373. In other words, the cam has two pushing ends for pushing the piston 34.

The wheel body 371 can rotate along its central axis, to move the first pushing protrusion 372 and the second pushing protrusion 373 in an arc path, thereby pushing the piston 34 to move. The wheel body 371 has a pivot hole 3711 defined in the middle portion thereof, through which the wheel body 371 is mounted to the output end of the drive motor 38 and operably rotates around the output end. In addition, a plurality of lightening grooves is also provided on the wheel body 371 for reducing weight and energy consumption.

The first push protrusion 372 and the second push protrusion 373 are disposed apart on the side of the wheel body 371 facing the piston 34. Both the first pushing protrusion 372 and the second pushing protrusion 373 are cylindrical, and the extending direction thereof is consistent with the extending direction of the pivot hole 3711. The height of the first pushing protrusion 372 is higher than that of the second pushing protrusion 373.

The shape and height of the first pushing protrusion 372 are adapted to be corresponding to the setting of the first thrust portion 3414 of the piston 34, and the shape and height of the second pushing protrusion 373 adapted to be corresponding to the setting of the second thrust portion 3415 of the piston 34.

As such an arrangement disclosed above, the piston 34 can only move along the predetermined nail firing direction D1 when firing nails, and can cooperate with the pushing member 37, and can only move along the predetermined energy storage direction D2 when the spring assembly 33 is storing energy.

In certain embodiments, the energy storage process of the spring assembly 33 includes the following two stages:

In the first energy storage stage: the pushing member 37 rotates under the drive of the driving motor 38. With the rotation of the pushing member 37, the second pushing protrusion 373 first rotates to the second thrust portion 3415 of the piston 34, and contacts with the second thrust portion 3415 of the piston 34 to abut against each other, meanwhile the pushing member 37 continues to rotate, the second pushing protrusion 373 makes an arc-shaped movement toward the energy storage direction, and applies an arc-shaped pushing force toward the energy storage direction to the piston 34 through the second thrust portion 3415 of the piston 34, under the action of the pushing force the piston 34 move along the guide rod 32 along the energy storage direction, thereby compressing the first force supply spring 331*a* and the second force supply spring 331*b* to perform energy storage in the first stage. When the second pushing protrusion 373 rotates to the maximum stroke along the energy storage direction, the first stage of energy storage is completed, and then enters the second stage of energy storage.

The second energy storage stage: the pushing member 37 continues to rotate, and the second pushing protrusion 373 rotates accordingly and breaks away (disengages) from the second thrust portion 3415 of the piston 34. At the same time, the first pushing protrusion 372 rotates to the first thrust portion 3414 of the piston 34 and contacts with the second thrust portion 3415 of the piston 34 to abut against each other, and then, the first push protrusion 372 pushes the piston 34 further in the energy storage direction in the same way, until the first push protrusion 372 rotates along the energy storage direction to the maximum stroke, completing the second stage of energy storage.

After the second stage of energy storage is completed, nailing can be performed. When nailing, the driving motor 38 drives the pushing member 37 to continue to rotate, and the first pushing protrusion 372 rotates accordingly and breaks away from the first thrust portion 3414. At this moment, the first pushing protrusion 372 and the second pushing protrusion 373 are located outside the moving path of the piston 34, so that the piston 34, under the elastic force of the spring assembly 33, moves towards the nail firing direction until the piston 34 hits the front limiting seat 312 to complete the nail firing process.

In the exemplary embodiment, the wheel body 371 is connected to the output end of the driving motor 38 through the one-way bearing 39. The one-way bearing 39 can limit the rotation direction of the output end of the driving motor 38, to allow the driving motor 38 rotating only in one direction. Therefore, during the first stage of energy storage or the second stage of energy storage described above, once the drive motor 38 stops working, the pushing member 37 will not rotate in reverse under the force of the piston 34, thereby avoiding false nail firing.

The driving motor 38 and the one-way bearing 39 can be existing driving motors and one-way bearings.

Figure 5:
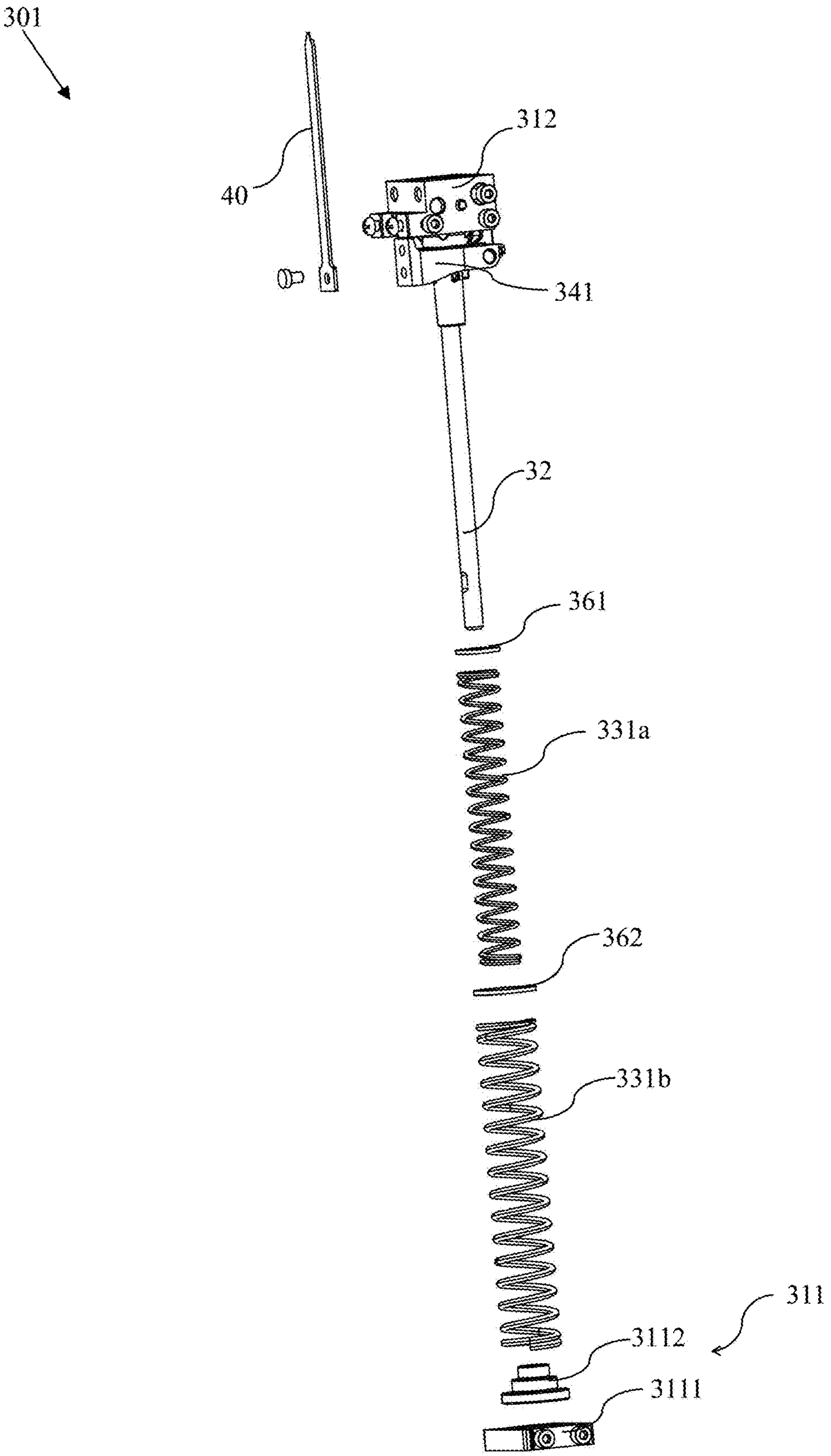
FIG. 5 shows schematically an exploded view of the driving force supply unit shown in FIG. 4.

As shown in FIGS. 5 and 9, spring buffer pieces 36 are also provided between the piston 34 and the springs 331. The number of the spring buffer pieces 36 is equal to the number of the springs 331. The spring buffer pieces 36 and the springs 331 are set in one-to-one correspondence, for buffering the impact of the corresponding spring 331 on the piston 34 when the nailing is completed. Each spring buffer piece 36 is, for example, a metal washer or a rubber washer.

In the exemplary embodiment, the spring buffer pieces 36 includes a first spring buffer piece 361 and a second spring buffer piece 362. The first spring buffer piece 361 is disposed between the inner spring 331*a* and the second front limiting boss 812 and sleeved on the first front limiting boss 811. That is, the inner spring 331*a* abuts against the second front top surface 8122 of the second front limiting boss 812 through the first spring buffer piece 361. The second spring buffer piece 362 is disposed between the outer spring 331*b* and the third front limiting boss 813 and sleeved on the second front limiting boss 812. That is, the outer spring 331*b* abuts against the third front top surface 8132 of the third front limiting boss 813 through the second spring buffer piece 362.

In addition, a buffer member 41 is also provided between the piston 34 and the front limiting seat 312. The buffer member 41 is configured to buffer the impact of the piston 34 during nail firing, to protect the front limiting seat 312 and the piston 34, and at the same time, the setting of the buffer member 41 can also reduce the rebound force of the piston 34. In the exemplary embodiment, the buffer member 41 is a cushion made of soft plastic material and is fixedly installed on the front limiting seat 312 and protrudes from the surface of the front limiting seat 312, so that the piston 34 does not directly hit the front limiting seat 312 when nailing. The buffer member 41 has a through hole defined in the central portion, where the through hole matches the guide rod 32. As assembled, the guide rod 32 passes through the through hole of the buffer member 41.

The striker 40 is mounted on the striker mounting portion 3413 and has a mounting end 401 and an opposite, nail firing end 402. The mounting end 401 is detachably mounted on the striker mounting portion 3413 through screws, so that the striker 40 is fixedly combined with the piston 34 and moves back and forth cooperatively with the piston 34. The nail firing end 402 is located in the front of the front limiting seat 312 and extends into the firing channel of the muzzle 50. When firing nails, the striker 40 moves along the nail firing direction at high speed driven by the piston 34 and then strikes the nail to realize nail firing.

The performances of the nail gun 10 with the spring assembly 33 including the inner spring 331*a* and the outer spring 331*b* according to one embodiment of the invention and a conventional nail gun with only a single spring are discussed below.

Due to the structural limitation of the nail gun, for a spring, the maximum installation length is 126 mm, the maximum outer diameter (D is less than 24 mm, and the movement stroke is 60 mm. When the maximum stroke is reached, the spring force needs to reach more than 360 N.

As a comparison, the conventional nail gun uses a single spring, which is recorded as a reference spring, with a wire diameter of 2.98 mm, a middle diameter of 20.8 mm, a pitch of 8.5 mm, an effective number of turns of 16, and a length of 140 mm, the elastic coefficient is 4.84 N/mm.

Due to the limitation of the space structure of the nail gun, the force of a single spring cannot be too large, and the maximum force provided by the reference spring is about 360 N. If the force is continued, the fatigue strength of the reference spring will be exceeded, and the life span will be affected. However, according to the invention, under the same spatial structure constraints, the combined force of the two sets of composite springs can reach nearly 500 N.

In addition, the elastic coefficient of the reference spring is 4.84 N/mm, while the elastic coefficient of the outer spring 331*b* is 2.7 N/mm, and the elastic coefficient of the inner spring 331*a* is 2.67 N/mm. A spring with a lower elastic coefficient has a faster return speed, smaller rebound and longer life.

Table 1 is a comparison table of values of rebound acceleration of the outer spring and the inner spring in the nail gun 10 according to one embodiment of the invention and the single spring in the conventional nail gun.

TABLE 1

Performance comparison table of the nail gun 10 and the conventional nail gun

| | Rebound acceleration of springs | | | | | | | | | | Average |
|---|---|---|---|---|---|---|---|---|---|---|---|
| Outer spring + inner spring | 8.03 | 6.98 | 7.67 | 8.94 | 7.44 | 8.1 | 8.46 | 9.48 | 6.85 | 8.04 | 8.03 |
| A single spring | 9.15 | 9.77 | 10.08 | 9.65 | 9.43 | 8.99 | 9.45 | 9.63 | 9.23 | 9.48 | 9.47 |
| Average decrease percentage of the rebound acceleration | | | | | | | | | | | 15.2% |

Table 1 clearly shows that after the nails are fired, the acceleration value of the spring assembly 33 formed by the combination of the outer spring 331*b* and the inner spring 331*a* is significantly lower than that of a single spring, and the average acceleration value decreases by a ratio of 15.2%. In other words, the resilience of the nail gun 10 according to one embodiment of the invention after nailing is significantly smaller than that of the conventional nail gun after nailing. Moreover, due to the reduction of the resilience, the user experience of the nailing gun 10 is obviously better than that of the conventional nailing gun during the actual nailing process.

According to embodiments of the invention, the spring assembly 33 of the driving force supply unit 301 for the nail gun includes at least two springs 331 that are sheathed together sequentially, so the spring assembly 33 can provide a spring force greater than that of a single spring, thereby satisfying the need for greater spring force. In addition, this arrangement can also avoid the problem of insufficient nail force caused by increasing the spring force by increasing the wire diameter of the spring, and can also avoid the problem of which increasing the spring force by increasing the pitch of the spring or reducing the middle diameter of the spring still does not meet the need and seriously reduces the lifespan of the spring.

In one embodiment, the spring assembly 33 is configured such that the helical directions of two adjacent force supply springs 331 are opposite, whereby the spring force of the spring assembly 33 is more stable.

In one embodiment, the driving force supply unit 301 also includes a guide rod 32, the guide rod 32 is fixedly combined with the front limiting seat 312 and the rear limiting seat 311, and all the force supply springs 331 are sleeved on the guide rod 32, the piston 34 is movably installed on the guide rod 32. The arrangement of the guide rod 32 can prevent the springs 331 from twisting and deforming in the axial direction, which is beneficial to improve energy conversion. The arrangement of the guide rod 32 can also facilitate the installation of the piston 34 to allow the piston 34 to move only along the length of the guide rod 32.

In one embodiment, the two ends of each force supply spring 331 abut against the piston 34 and the rear limiting seat 311 respectively, and the centerlines of all force supply springs 331 coincide with the centerlines of the guide rod 32, which can further prevent the force supply springs 331 from twisting and deforming in the direction other than the axis.

In one embodiment, the rear limiting seat 311 includes a rear limiting multi-stage boss portion 3112, the piston 34 includes a front limiting multi-stage boss portion 3412. Each of the rear limiting multi-stage boss portion 3112 and the front limiting multi-stage boss portion 3412 includes a plurality of bosses arranged in sequence, and two adjacent bosses are used to limit a spring 331. Thus, such a configuration not only ensures that the centerlines of all the springs 331 are aligned coincidently with the center line of the guide rod 32, but also avoid interference between adjacent springs 331.

In one embodiment, the driving force supply unit 301 also includes a plurality of spring buffer pieces 36. The plurality of spring buffer pieces 36 is provided in one-to-one correspondence with the plurality of force supply springs 331 and arranged between the force supply springs 331 and the piston 34, which can buffer the impact of the corresponding spring on the piston 34 when firing nail.

In one embodiment, the driving force supply unit 301 also includes a pair of rolling elements 35, which are respectively rotatably fitted on both sides of the piston 34, the regulating frame 31 also has two regulating plates 313, and the two regulating plates 313 are respectively installed on both sides of the front limiting seat 312 and the rear limiting seat 311, the rolling element 35 abuts against the corresponding regulating plate 313, so that the two regulating plates 313 are not in direct contact with the piston 34, thereby reducing the frictional force due to the movement of the piston 34. In addition, the two regulating plates 313 can also function as a limit to prevent the piston 34 from rotating around the guide rod 32.

In one embodiment, the piston main body 341 is made of aluminum, and the first piston protection member 342 and the second piston protection member 343 are both made of iron. In practice, the piston main body 341 can also be made of plastic, or the like, and the first piston protection member 342 and the second piston protection member 343 may also be titanium coated.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

What is claimed is:

1. A driving mechanism used for a nail gun, comprising:

a driving force supply unit comprising:

- a frame structure having a front limiting seat and an opposite, rear limiting seat;
- a piston movably arranged between the front limiting seat and the rear limiting seat in the frame structure;
- a striker co-movably connected to the piston such that the nail striking member operably moves backward and forward through the front limiting seat the frame structure; and
- a spring assembly disposed between the piston and the rear limiting seat in the frame structure and configured such that when the piston is driven to move backward in the frame structure, the spring assembly is pushed into a contract state to store energy therein, and when the piston is free, the spring assembly expands to release the stored energy therein to push the piston to move forward in the frame structure so that the striker is co-moved therewith to strike a nail out of a muzzle, wherein the spring assembly comprises a plurality of springs sheathed together sequentially, and wherein helical directions of two adjacent springs are opposite; and
- a guide rod fixedly attached onto the front limiting seat and the rear limiting seat, wherein all the springs are sleeved on the guide rods, and wherein the piston is movably mounted on the guide rod, wherein two ends of each spring abut against the piston and the rear limiting seat, respectively, and wherein the centerlines of all the springs coincide with the centerlines of the guide rod.

2. The driving mechanism of claim 1, wherein the rear limiting seat comprises a rear limiting multi-stage boss portion, wherein the rear limiting multi-stage boss portion includes a plurality of bosses arranged in sequence, and two adjacent bosses are used to limit one of the springs, wherein each boss has a lateral surface for supporting and limiting one of the springs, and a top surface for abutting against another one of the springs.

3. The driving mechanism of claim 1, wherein the piston comprises:

- a main body;
- a front limiting multi-stage boss portion formed on the main body;
- a striker mounting portion formed on a top side of the main body;
- a first thrust portion and a second thrust portion formed on the bottom side of the main body, wherein the first thrust portion extends from the main body toward a nail firing direction, the second thrust portion extends from the main body in a direction substantially perpendicular to the extension direction of the first thrust portion;
- a first piston protection member and the second piston protection member configured to protect the first thrust portion and the second thrust portion, respectively and
- a through hole defined through a central portion of the front limiting multi-stage boss portion and a central portion of the main body for moveable receiving the guide rod.

4. The driving mechanism of claim 3, wherein the front limiting multi-stage boss portion includes a plurality of bosses arranged in sequence, and two adjacent bosses are used to limit one of the springs, wherein each boss has a lateral surface for supporting and limiting one of the springs, and a top surface for abutting against another one of the springs.

5. The driving mechanism of claim 3, further comprising a driving unit is arranged under the driving force supply unit and configured to drive the driving force supply unit to provide force for nailing.

6. The driving mechanism of claim 5, wherein the driving unit comprises a push member operably coupled with the piston, a drive motor configured to drive the push member, and a one-way bearing configured to limit the driving motor to rotate only in one direction.

7. The driving mechanism of claim 6, wherein the pushing member is configured to push the piston to move towards an energy storage direction to compress the springs of the spring assembly to store energy therein.

8. The driving mechanism of claim 7, wherein the pushing member is a cam having a wheel body, a first pushing protrusion and a second pushing protrusion disposed apart on the wheel body facing the piston.

9. The driving mechanism of claim 8, wherein the first pushing protrusion and the second pushing protrusion are cylindrical, and the first pushing protrusion has a height higher than that of the second pushing protrusion.

10. The driving mechanism of claim 9, wherein when the wheel body is driven to rotate, the rotation of the wheel body causes the first pushing protrusion and the second pushing protrusion to move in an arc path accordingly, the movement of the first pushing protrusion and the second pushing protrusion in turn causes the piston to move towards the rear limiting seat, thereby compressing the spring assembly in the energy storage direction to store energy accordingly.

11. The driving mechanism of claim 10, wherein in operation, the pushing member rotates under driving of the driving motor, with the rotation of the pushing member, the second pushing protrusion first rotates to the second thrust portion of the piston, and contacts with the second thrust portion of the piston to abut against each other, meanwhile the pushing member continues to rotate, the second pushing protrusion makes an arc-shaped movement toward the energy storage direction, and applies an arc-shaped pushing force toward the energy storage direction to the piston through the second thrust portion, under the action of the pushing force the piston moves along the guide rod along the energy storage direction, thereby compressing the springs to perform energy storage in a first stage of energy storage, and wherein when the second pushing protrusion rotates to the maximum stroke along the energy storage direction, the first stage of energy storage is completed, and then enters a second stage of energy storage.

12. The driving mechanism of claim 11, wherein in second stage of energy storage, the pushing member continues to rotate, and the second pushing protrusion rotates accordingly and breaks away from the second thrust portion of the piston, meanwhile, the first pushing protrusion rotates to the first thrust portion of the piston and contacts with the first thrust portion second stage of energy storage to abut against each other, and then, the first push protrusion pushes the piston further in the energy storage direction in the same way, until the first push protrusion rotates along the energy storage direction to the maximum stroke, completing the second stage of energy storage.

13. The driving mechanism of claim 12, wherein after the second stage of energy storage is completed, nailing is performed, wherein the driving motor drives the pushing member to continuously rotate, and the first pushing protrusion rotates accordingly and breaks away from the first thrust portion of the piston, at this moment, the first pushing protrusion and the second pushing protrusion are located outside the moving path of the piston, such that the piston, under the elastic force of the spring assembly, moves towards the nail firing direction until the piston strikes the front limiting seat to complete the nail firing process.

14. A nail gun for nailing, comprising:

the driving mechanism of claim 5.

15. The driving mechanism of claim 1, wherein the spring assembly comprises an inner spring sleeving on the guide rod, and an outer spring sleeving on the inner spring, wherein the inner spring has a length in a range of about 110-125 mm, and an elastic constant in a range of about 2.45-2.89 N/mm, and wherein the outer spring has a length in a range of about 130-150 mm, and an elastic constant in a range of about 2.5-2.9 N/mm.

16. The driving mechanism of claim 1, wherein the driving force supply unit further comprises a plurality of spring buffer pieces arranged corresponding to the plurality of springs one by one, and arranged between the springs and the piston, for buffering the impact of the springs.

* * * * *